US009858467B2

United States Patent
Yoon

(10) Patent No.: US 9,858,467 B2
(45) Date of Patent: Jan. 2, 2018

(54) METHOD AND APPARATUS FOR RECOGNIZING FINGERPRINTS

(71) Applicant: Samsung Electronics Co., Ltd., Gyeonggi-do (KR)

(72) Inventor: Sung-Jin Yoon, Gyeonggi-do (KR)

(73) Assignee: Samsung Electronics Co., Ltd (KR)

( * ) Notice: Subject to any disclaimer, the term of this patent is extended or adjusted under 35 U.S.C. 154(b) by 56 days.

(21) Appl. No.: 14/328,200

(22) Filed: Jul. 10, 2014

(65) Prior Publication Data

US 2015/0016695 A1    Jan. 15, 2015

(30) Foreign Application Priority Data

Jul. 10, 2013    (KR) .................. 10-2013-0081021

(51) Int. Cl.
  *G06K 9/00* (2006.01)
  *G06F 21/32* (2013.01)
  *G06K 9/32* (2006.01)

(52) U.S. Cl.
  CPC .......... *G06K 9/00087* (2013.01); *G06F 21/32* (2013.01); *G06K 2009/3291* (2013.01)

(58) Field of Classification Search
  CPC ................. G06F 21/32; G06K 9/0087; G06K 2009/3291; G06K 9/00067; G06K 9/3208
  USPC ........................................... 382/124
  See application file for complete search history.

(56) References Cited

U.S. PATENT DOCUMENTS

2010/0133338 A1*  6/2010  Brown ................... G06F 21/32
                                            235/382
2012/0127179 A1*  5/2012  Aspelin .................. G06F 21/32
                                            345/441

FOREIGN PATENT DOCUMENTS

KR    20040102252 A    12/2004
KR    20110018598 A    2/2011

* cited by examiner

*Primary Examiner* — Manuchehr Rahmjoo
(74) *Attorney, Agent, or Firm* — The Farrell Law Firm, P.C.

(57) ABSTRACT

A fingerprint recognition method and apparatus are provided for quickly and accurately authenticating a user using a direction of a fingerprint. The fingerprint recognition method includes sensing a fingerprint input from a user; creating fingerprint data including a direction angle of the fingerprint input; and authenticating the user based on the fingerprint data.

7 Claims, 13 Drawing Sheets

METHOD AND APPARATUS FOR RECOGNIZING FINGERPRINTS

PRIORITY

This application claims priority under 35 U.S.C. §119(a) to Korean Patent Application Serial No. 10-2013-0081021, which was filed in the Korean Intellectual Property Office on Jul. 10, 2013, the entire disclosure of which is hereby incorporated by reference.

BACKGROUND OF THE INVENTION

1. Field of the Invention

The present invention relates generally to a method and apparatus for recognizing fingerprints, and more specifically, to a method and apparatus for quickly and accurately authenticating a user based on a direction of a fingerprint input by the user.

2. Description of the Related Art

A fingerprint, which is one of the simplest and most reliable biometric features of human for identification, has been widely used for person authentication because it has uniqueness and constancy. Fingerprint recognition technology is largely classified into fingerprint classification and fingerprint matching. Fingerprint classification is technology of classifying a large fingerprint database into different classes, such as whorl, arch, tented arch, left loop, right loop, etc., e.g., based on the Henry system, which was developed to improve the performance of automated fingerprint recognition systems.

In general, fingerprint recognizers for person authentication authenticate a user by receiving the user's fingerprint and determining if the user's fingerprint matches a registered fingerprint. However, fingerprint recognizers according to the related art cannot recognize a user's fingerprint when the user the fingerprint is input in a different direction from that in which a fingerprint recognition sensor is positioned. Accordingly, users are often required to input their fingerprints several times for authentication.

SUMMARY OF THE INVENTION

Accordingly, the present invention has been designed to address at least the above-mentioned problems and/or disadvantages and to provide at least the advantages described below.

An aspect of the present invention is to provide a fingerprint recognition method and apparatus for quick and accurate authentication of a user based on a direction of a fingerprint input by the user.

In accordance with an aspect of the present invention, a fingerprint recognition method of a fingerprint recognition apparatus is provided, which includes sensing a fingerprint input from a user; creating fingerprint data including a direction angle of the fingerprint input; and authenticating the user based on the fingerprint data.

In accordance with another aspect of the present invention, a fingerprint recognition apparatus is provided, which includes a fingerprint recognition unit configured to sense a fingerprint input from a user; and a controller configured to create fingerprint data including a direction angle of the fingerprint input, and to authenticate the user based on the fingerprint data.

BRIEF DESCRIPTION OF THE DRAWINGS

The above and other aspects, features, and advantages of certain embodiments of the present invention will be more apparent from the following description taken in conjunction with the accompanying drawings, in which.

Throughout the drawings, like reference numerals will be understood to refer to like parts, components, and structures.

DETAILED DESCRIPTION OF EMBODIMENTS OF THE INVENTION

Various embodiments of the present invention will now be described in detail with reference to the accompanying drawings. In the following description, specific details such as detailed configuration and components are merely provided to assist the overall understanding of these embodiments of the present invention. Therefore, it should be apparent to those skilled in the art that various changes and modifications of the embodiments described herein can be made without departing from the scope and spirit of the present invention. In addition, descriptions of well-known functions and constructions are omitted for clarity and conciseness.

Figure 1:
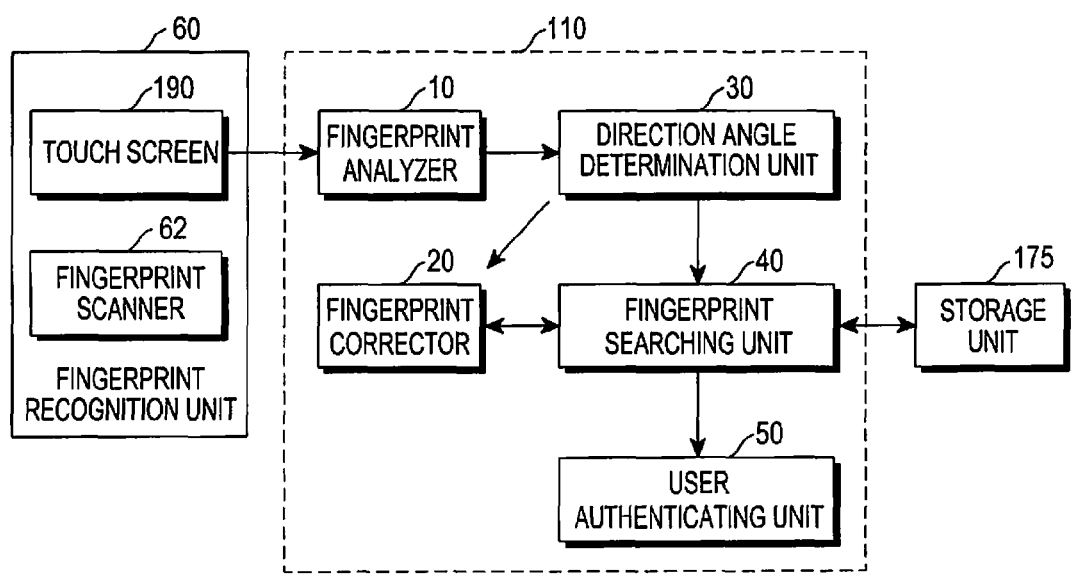
FIG. 1 is a block diagram illustrating a fingerprint recognition apparatus according to an embodiment of the present invention.

FIG. 1 is a block diagram illustrating a fingerprint recognition apparatus according to an embodiment of the present invention.

Referring to FIG. 1, the fingerprint recognition apparatus includes a fingerprint recognition unit 60, a controller 110, and a storage unit 175.

The fingerprint recognition unit 60 receives a fingerprint from a user. To do this, the fingerprint recognition unit 60 includes a fingerprint scanner 62 and a touch screen 190. The fingerprint scanner 62 may also be referred to as a fingerprint recognition sensor. Further, although the fingerprint recognition unit 60 illustrated in FIG. 1 includes both the fingerprint scanner 62 and the touch screen 190, alternatively, the fingerprint recognition unit 60 may include one of the fingerprint scanner 62 and the touch screen 190.

The fingerprint scanner 62 scans a fingerprint of a user. The fingerprint scanner 62 may be physically included in or separated from the fingerprint recognition apparatus. A user may press a scan area of the fingerprint scanner 62 with his/her fingertip part including a fingerprint, thereby inputting the fingerprint to the fingerprint recognition apparatus 1.

When a fingertip including a fingerprint contacts a scan area of the fingerprint scanner 62, the fingerprint scanner 62 scans the fingertip to create an image (i.e., a fingerprint image). Herein, for convenience of description, a fingerprint input as a user input will be referred to as a "fingerprint input", and an image created by the fingerprint scanner 62 based on the fingerprint input will be referred to as a "fingerprint image". The fingerprint input may be also referred to as an "input fingerprint" or "a user input fingerprint".

The touch screen 190 may include a fingerprint recognition sensor (not shown), such that the touch screen 190 may receive a touch input (for example, a fingerprint) from a user at any location on the touch screen 190 to create a fingerprint image.

The fingerprint recognition apparatus may request a user to input a fingerprint according to predetermined criteria. For example, security levels of applications associated with the fingerprint recognition apparatus may be classified into "high", "middle", and "low". When a user tries to execute an application with the security level set to "high", the fingerprint recognition apparatus associated with the application requests the user to input a fingerprint before executing the application.

The controller 110 controls the overall operation of the fingerprint recognition apparatus. Accordingly, the controller 110 compares the fingerprint image created by the fingerprint recognition unit 60 to at least one fingerprint image stored in the storage unit 175, in order to perform user authentication.

The controller 110 includes a fingerprint analyzer 10, a direction angle determination unit 30, a fingerprint corrector 20, a fingerprint searching unit 40, and a user authenticating unit 50.

The fingerprint analyzer 10 analyzes a fingerprint image created by the fingerprint recognition unit 60. For example, the fingerprint analyzer 10 may analyze the fingerprint image to create fingerprint data corresponding to the fingerprint image. Alternatively, the fingerprint analyzer 10 may analyze a fingerprint input, before a fingerprint image is created by the fingerprint recognition unit 60, to create fingerprint data.

In accordance with an embodiment of the invention, the fingerprint input may include a pressed area and a hovering area. The pressed area represents a portion of the fingertip that actually contacts the fingerprint recognition unit 60, and the hovering area represents a portion of the fingertip that does not actually contact an area of the fingerprint recognition unit 60, when the pressed area is pressed by the user's finger. For example, the hovering area may be a proximity sensing input that is generated by the user.

For example, if the fingerprint recognition unit 60 include the touch screen 190, and a user has pressed the fingerprint recognition unit 60 with a first of three phalanges of the user's right hand index finger, an area of the fingerprint recognition unit 60 that the first phalange contacts corresponds to a pressed area. When the first phalange contacts the pressed area, the second and third phalanges of the index finger may be positioned close to the fingerprint recognition unit 60, without actually contacting the fingerprint recognition unit 60. When the second and third phalanges of the index finger are positioned close to the fingerprint recognition unit 60, capacitance of an area of the fingerprint recognition unit 60 below the second and third phalanges of the index finger may change. The area of the fingerprint recognition unit 60 in which capacitance has changed corresponds to a hovering area.

Accordingly, fingerprint data may include data about a pressed area and a hovering area. For example, the data about a pressed area and a hovering area may include coordinates, shapes, and sizes of a pressed area and/or a hovering area.

The fingerprint analyzer 10 may control the fingerprint recognition unit 60 to scan a fingerprint pattern included in the pressed area of the fingerprint input. If fingerprint data corresponding to the fingerprint input is created, the fingerprint analyzer 10 may then store the fingerprint data in the storage unit 175.

The fingerprint analyzer 10 may determine whether a user input (a touch input) received through the fingerprint recognition unit 60 is a fingerprint input. For example, if the user input includes a hovering area, the fingerprint analyzer 10 may determine that the user input is a fingerprint input. Alternatively, if the size of a pressed area of a user input is larger than a reference size, e.g., which is stored in the storage unit 175, the fingerprint analyzer 10 may determine that the user input is a fingerprint input.

The direction angle determination unit 30 determines the direction angle of the fingerprint. In accordance with an embodiment of the invention, the direction angle of the fingerprint included in the fingerprint input may be an angle at which the fingerprint of a particular finger is inclined with respect to a fingerprint of another finger.

For example, when a user simultaneously inputs fingerprints of all five fingers on the user's left hand to the fingerprint recognition unit 60, if a direction in which the fingerprint of the middle finger is input is a correct direction (i.e., has a direction angle of 0°), a direction in which the fingerprint of the thumb is input will be inclined to the right with respect to the correct direction.

After the direction angle of the fingerprint input is determined, the fingerprint corrector 20 of the controller 110 may create corrected data by reversely rotating the fingerprint by the direction angle. In accordance with an embodiment of the invention, the fingerprint corrector 20 may create comparative data (or reference data) by rotating at least one fingerprint stored in the storage unit 175 by the direction angle in order to compare the fingerprint data to the comparative data.

The fingerprint searching unit 40 searches for a fingerprint matching the fingerprint included in the fingerprint input, in the storage unit 175. For example, the fingerprint searching unit 40 may compare the corrected data created by the fingerprint corrector 20 to at least one fingerprint stored in the storage unit 175, or may compare the fingerprint included in the fingerprint input to the comparative data created by the fingerprint corrector 20. The fingerprint searching unit 40 outputs the comparison result to the user authenticating unit 50.

According to an embodiment of the present invention, the fingerprint searching unit 40 may determine a similarity between the corrected data and the fingerprint stored in the storage unit 175, or a similarity between the fingerprint included in the fingerprint input and the comparative data. For example, the fingerprint searching unit 40 may search for a fingerprint having a similarity that is greater than or equal to a similarity reference value (for example, 90%)

stored in the storage unit 175, with respect to the fingerprint included in the fingerprint input.

The user authenticating unit 50 authenticates the user who has input the fingerprint to the fingerprint recognition apparatus, if the fingerprint included in the fingerprint input is a fingerprint registered in the fingerprint recognition apparatus. However, if the fingerprint included in the fingerprint input does not match any fingerprint registered in the fingerprint recognition apparatus, the user authenticating unit 50 determines that the user is a non-authorized user, thereby failing to authenticate the user.

According to an embodiment of the present invention, the user authenticating unit 50 authenticates a user based on a similarity between the corrected data and the fingerprint stored in the storage unit 175 or similarity between the fingerprint included in the fingerprint input and the comparative data. For example, if a fingerprint having a similarity of 95% or more to the fingerprint included in the fingerprint input is found in the storage unit 175, the user authenticating unit 50 determines that the fingerprint included in the fingerprint input matches the fingerprint stored in the storage unit 175. That is, the user authenticating unit 50 determines that the user is registered in the fingerprint recognition apparatus, successfully authenticating the user.

Similarly, if the corrected data obtained by reversely rotating the fingerprint included in the fingerprint input by the direction angle has a similarity of 95% or more to a fingerprint stored in the storage unit 175, the user authentication unit 50 determines that the user is registered in the fingerprint recognition apparatus, successfully authenticating the user.

Figure 2A:
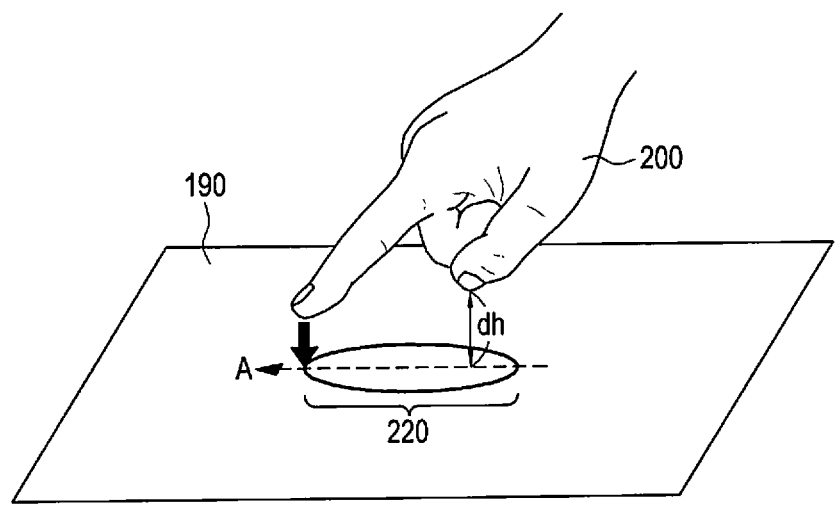
FIGS. 2A, 2B, and 2C illustrate an example of a fingerprint input being recognized by a fingerprint recognition apparatus according to an embodiment of the present invention.
Figure 2B:
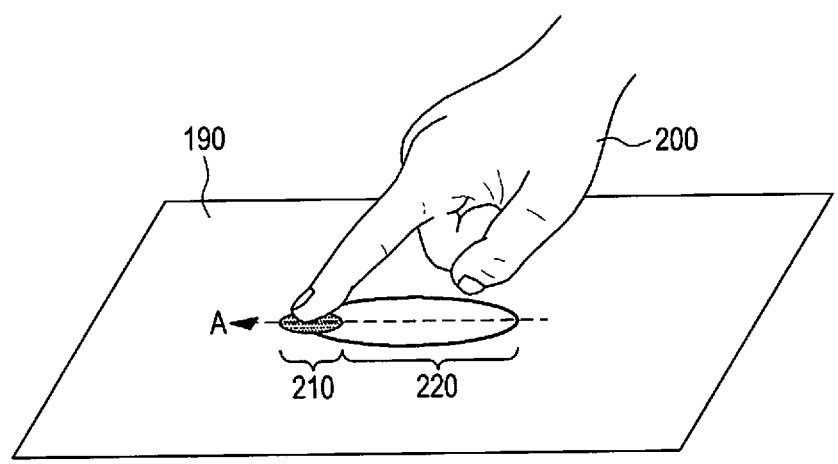
Figure 2C:
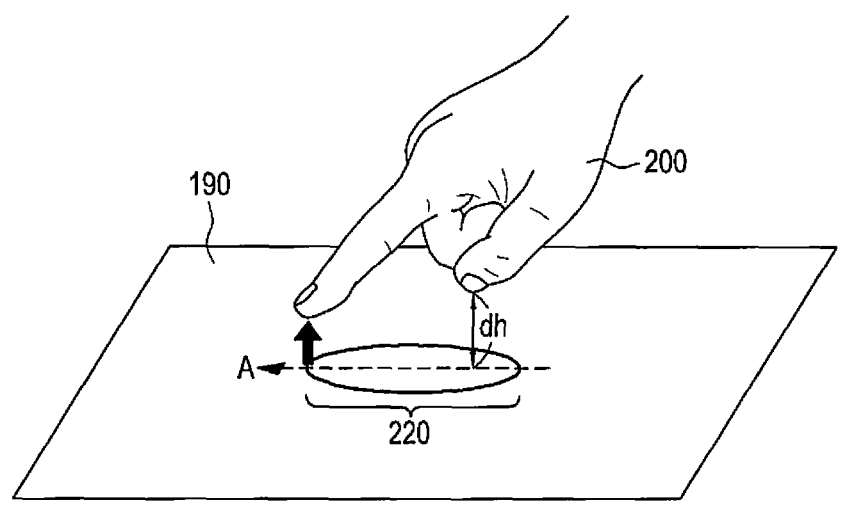

FIGS. 2A, 2B, and 2C illustrate an example of a fingerprint input being recognized by a fingerprint recognition apparatus according to an embodiment of the present invention. Specifically, FIGS. 2A, 2B, and 2C illustrate a sequential operation in which a user 200 inputs a fingerprint through the touch screen 190.

Referring to FIGS. 2A, 2B, and 2C, the user 200 presses the touch screen 190 with a fingerprint part of the index finger to input the fingerprint to the fingerprint recognition apparatus. Specifically, FIG. 2A illustrates before the user 200 presses the touch screen 190 with the index finger, FIG. 2B illustrates when the user 200 is pressing the touch screen 190 with the index finger, and FIG. 2C illustrates after the user 200 lifts the index finger off of the touch screen 190.

Referring to FIG. 2A, a hovering area 200 is formed on the touch screen 190, although no pressed area 210 (see FIG. 2B) is formed, as the index finger does not actually contact the touch screen 190. Similarly, referring to FIG. 2C, a hovering area 220 will also be formed as the index finger is lifted off of the touch screen 190.

As described above, the fingerprint recognition unit 60 may sense the hovering area 200 formed on the touch screen 190 under the control of the controller 110, as illustrated in FIGS. 2A and 2C. For example, the fingerprint recognition unit 60 may detect a change in capacitance that occurs within a predetermined distance range from the touch screen 190, thereby sensing the hovering area 220. In order for the user 200 to input a fingerprint through the touch screen 190, a distance between the user's hand and the touch screen 190 must eventually be shorter than a predetermined distance (hereinafter, referred to as a reference distance dh). When the user's hand moves within the reference distance dh to the touch screen 190, capacitance of an area of the touch screen 190 below the user's hand changes. The fingerprint recognition unit 60 may then detect the change in capacitance, thereby sensing the hovering area 220 as a fingerprint input before the user's finger actually contacts the touch screen 190.

If the hovering area 220 is sensed as illustrated in FIGS. 2A, 2B, and 2C, the fingerprint analyzer 10 may analyze the fingerprint input to create fingerprint data. More specifically, the fingerprint analyzer 10 creates fingerprint data, e.g., the coordinates, shape, size, direction, etc., of the hovering area 220. The direction angle determination unit 30 may calculate a direction angle of the fingerprint included in the fingerprint input using the fingerprint data about the hovering area 220.

In the example illustrated in FIGS. 2A to 2C, the hovering area 220 indicates a direction A, and the direction angle determination unit 30 may determine the direction A to be a direction of the fingerprint input.

The fingerprint input illustrated in FIG. 2B includes both a pressed area 210 and the hovering area 220, and is received through the touch screen 190 when the user 200 touches the fingerprint recognition unit 60.

Figure 3:
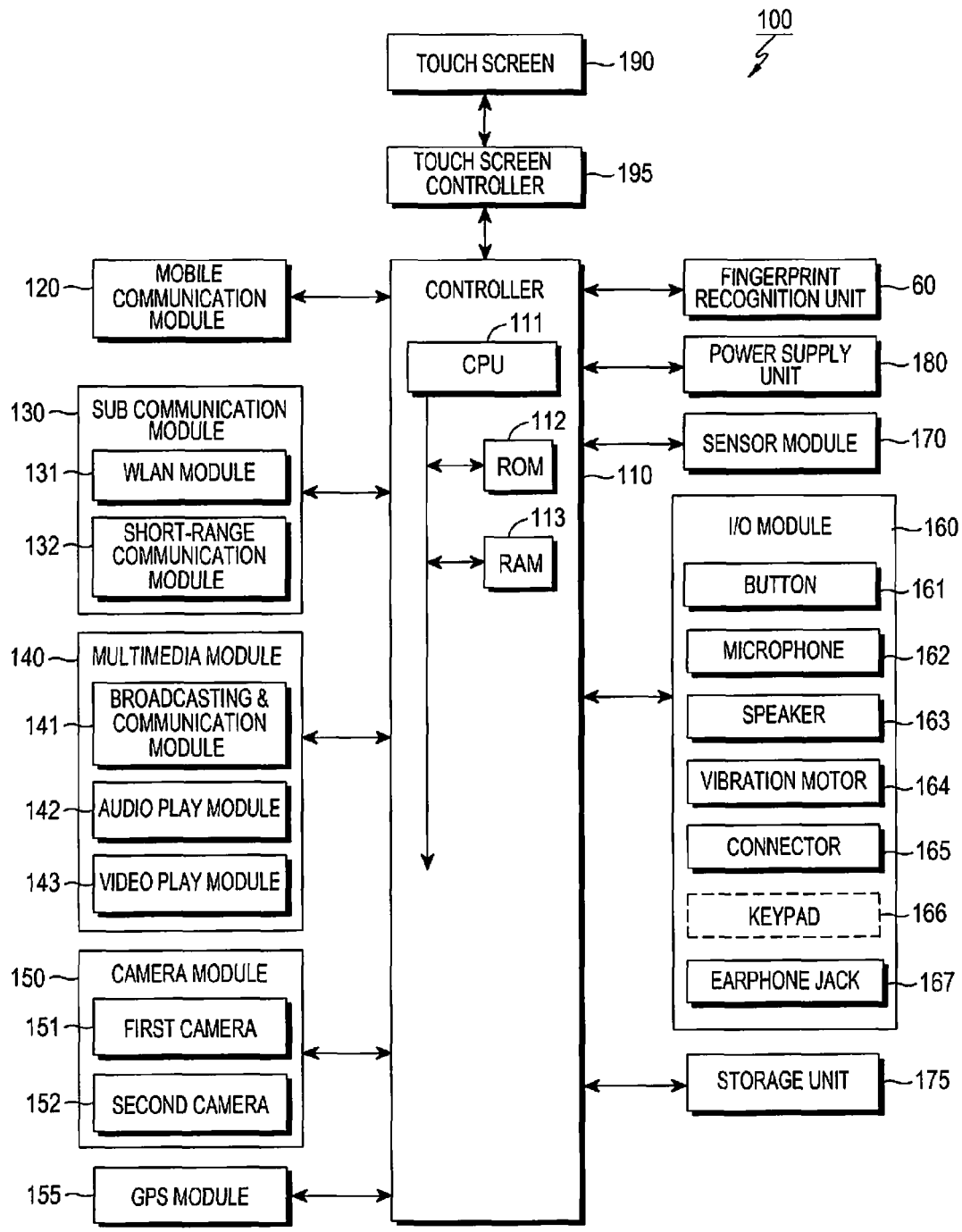
FIG. 3 is a block diagram illustrating a mobile terminal including a fingerprint recognition apparatus according to an embodiment of the present invention.

FIG. 3 is a block diagram illustrating a mobile terminal including a fingerprint recognition apparatus according to an embodiment of the present invention.

Referring to FIG. 3, a mobile terminal 100 includes the controller 110, the fingerprint recognition unit 60, the storage unit 175, and the touch screen 190. The mobile terminal 100 further includes a mobile communication module 120, a sub communication module 130, a multimedia module 140, a camera module 150, a Global Positioning System (GPS) module 155, an input/output module 160, a sensor module 170, a power supply unit 180, and a touch screen controller 195.

As described above, the fingerprint recognition unit 60 receives a fingerprint from a user. Further, as illustrated in FIG. 1, the fingerprint recognition unit 60 may include at least one of the fingerprint scanner 62 and the touch screen 190. According to an embodiment of the invention, the fingerprint recognition unit 60 may also include the sensor module 170 including a fingerprint recognition sensor (not shown).

The controller 110 includes a Central Processing Unit (CPU) 111, a Read Only Memory (ROM) 112 that stores control programs for controlling the mobile terminal 100, and a Random Access Memory (RAM) 113 that stores signals/data received from an external device or tasks being executed by the mobile terminal 100. For example, the CPU 111 may be a single-core or a multi-core processor (e.g., a dual-core processor, a triple-core processor, a quad-core processor, or a penta-core processor, etc.). The CPU 111, the ROM 112, and the RAM 113 are connected to each other through internal buses.

The controller 110 controls the fingerprint recognition unit 60, the mobile communication module 120, the sub communication module 130, the multimedia module 140, the camera module 150, the GPS module 155, the input/output module 160, the sensor module 170, the storage unit 175, the power supply unit 180, the touch screen 190, and the touch screen controller 195.

The controller 110 may also include, as illustrated in FIG. 1, the fingerprint analyzer 10, the direction angle determination unit 30, the fingerprint corrector 20, the fingerprint searching unit 40, and the user authenticating unit 50.

As described above, the controller 110 compares a fingerprint input received through the fingerprint recognition unit 60 to fingerprints stored in the storage unit 175, in order to authenticate a user.

According to an embodiment of the invention, the controller 110 controls the mobile terminal 100 to perform operation according to a touch input sensed as a user input through the touch screen 190. If a touch input is received through the touch screen 190, the controller 110 controls the mobile terminal 100 to perform operation corresponding to the touch input.

The camera module 150 includes first and second cameras 151 and 152 for photographing still images or moving images under the control of the controller 110. The first camera 151 or the second camera 152 may include a secondary light source (e.g., a flash (not shown)) to provide an amount of light required for photographing. The first camera 151 may be disposed in the front side of the mobile terminal 100, and the second camera 152 may be disposed in the rear side of the mobile terminal 100. According to another embodiment, the first camera 151 and the second camera 152 may be disposed adjacent to each other (for example, the first camera 151 may be spaced by a distance between 1 cm and Scam apart from the second camera 152) to photograph 3-dimensional (3D) still images or 3D moving images.

The storage unit 175 stores signals or data that is input/output according to operations of the fingerprint recognition unit 60, the mobile communication module 120, the sub communication module 130, the multimedia module 140, the camera module 150, the GPS module 155, the input/output module 160, the sensor module 170, or the touch screen 190, under the control of the controller 110. The storage unit 175 stores control programs and applications for controlling the mobile terminal 100 or the controller 110.

In this description, the term a "storage unit" includes the storage unit 175, the ROM 112 or RAM 113 included in the controller 110, and a memory card (not shown, for example, a Secure Digital (SD) card or a memory stick) installed in the mobile terminal 100. The storage unit 175 may include a non-volatile memory, a volatile memory, a Hard Disk Drive (HDD), or a Solid State Drive (SSD).

The touch screen 190 provides a user with User Interfaces (UIs) corresponding to various services (for example, a call, data transmission, broadcasting, photography, etc.). The touch screen 190 may transmit an analog signal corresponding to at least one touch input to a user interface to the touch screen controller 195. The touch screen 190 may receive at least one touch through a user's body part (for example, a finger including a thumb) or a touchable input unit (for example, a stylus pen). Also, the touch screen 190 may receive a drag operation. The touch screen 190 may output an analog signal corresponding to a drag operation to the touch screen controller 195.

As described above, a touch operation is not limited to a contact between the touch screen 190 and a user's body part or a pointing device, and includes a contactless touch operation, i.e., the hovering area 220. A distance detectable by the touch screen 190 may vary depending on the performance or structure of the mobile terminal 100. For example, a distance detectable by the touch screen 190 may be 1 mm or more.

The touch screen 190 may be a resistive type, a capacitive type, an infrared type, or an acoustic wave type. The touch screen 190 may receive a multi-touch input of simultaneously touching at least two points on the touch screen 190. If a multi-touch input is received, the touch screen 190 displays a drawing tool under the control of the controller 110. Then, if a user input (e.g., a touch input) except for a multi-touch input is received, the touch screen 190 may display a line or a figure corresponding to the touch input according to the drawing tool under the control of the controller 110.

The sub communication module 130 includes a WLAN module 131 and a short-range communication module 132. The multimedia module 140 includes a broadcasting & communication module 141, an audio play module 142, and a video play module 143. The input/output module 160 includes a button 161, a microphone 162, a speaker 163, a vibration motor 164, a connector 165, and a keypad 166.

The mobile communication module 120 connects the mobile terminal 100 to an external device through mobile communication using at least one antenna (not shown) under the control of the controller 110. The mobile communication module 120 transmits/receives radio signals for voice calls, video calls, Short Message Service (SMS), or Multimedia Message Service (MMS) with a device (not shown) such as a mobile phone, a smart phone, a tablet PC, or another device having a phone number input to the mobile terminal 100, to/from the mobile terminal 100.

The sub communication module 130 includes, as described above, at least one of the WLAN module 131 and the short-range communication module 132. For example, the sub communication module 130 may include one of the WLAN module 131 and the short-range communication module 132, or both the WLAN module 131 and the short-range communication module 132.

The WLAN module 131 connects to the Internet at a place in which a wireless Access Point (AP) is installed, under the control of the controller 110. The WLAN module 131 supports IEEE802.11x. The short-range communication module 132 performs wireless short-range communication between the mobile terminal 100 and an imaging device (not shown) under the control of the controller 110. The short-range communication may include Bluetooth, InfraRed Data Association (IrDA), WiFi-Direct communication, and Near Field Communication (NFC).

The mobile terminal 100 includes at least one of the mobile communication module 120, the WLAN module 131, and the short-range communication module 132. For example, the mobile terminal 100 may include a combination of the mobile communication module 120, the WLAN module 131, and the short-range communication module 132.

The multimedia module 140 includes, as described above, a broadcasting & communication module 141, an audio play module 142, or a video play module 143. The broadcasting & communication module 141 receives a broadcasting signal (for example, a TeleVision (TV) broadcasting signal, a radio broadcasting signal, or a data broadcasting signal) and additional broadcasting information (e.g., an Electric Program Guide (EPG) or an Electric Service Guide (ESG)) transmitted from a broadcasting station through a broadcasting and communication antenna (not shown), under the control of the controller 110. For example, the audio play module 142 may reproduce a digital audio file (e.g., a file having the filename extension of ".mp3", ".wma", ".ogg", or ".wav", for example) that is stored or received under the control of the controller 110. The video play module 143 reproduces a digital video file (for example, a file having the filename extension of ".mpeg", ".mpg" ".mp4", ".avi", ".mov", or ".mkv", for example) or a digital audio file that is stored or received under the control of the controller 110.

However, the multimedia module 140 may include only the audio play module 142 and the video play module 143. The audio play module 142 and the video play module 143 of the multimedia module 140 may be included in the controller 110.

The GPS module 155 receives radio waves from a plurality of earth-orbiting GPS satellites (not shown), and calculates a position of the mobile terminal 100 using a time of arrival taken for the radio waves from the GPS satellites to arrive at the mobile terminal 100.

The input/output module 160 includes, as described above, at least one of a plurality of buttons 161, a microphone 162, a speaker 163, a vibration motor 164, a connector 165, and a keypad 166.

The buttons 161 are provided in the front, side, and/or rear part of the housing of the mobile terminal 100. The buttons 161 may include at least one of a power/lock button (not shown), volume buttons (not shown), a menu button (not shown), a home button (not shown), a back button (not shown), a search button (not shown).

The microphone 162 receives voice or sound under the control of the controller 110 to generate an electrical signal.

The speaker 163 receives various signals (e.g., a radio signal, a broadcasting signal, a digital audio file, a digital video file, or a photo file) from the mobile communication module 120, the sub communication module 130, the multimedia module 140, or the camera module 150, and outputs sound corresponding to the various signals to the outside of the mobile terminal 100, under the control of the controller 110. Also, the speaker 163 outputs sound (e.g., button sounds or currency connection sounds) corresponding to a function that is performed by the mobile terminal 100. The speaker 163 is provided as at least one unit at an appropriate location (or locations) on the housing of the mobile terminal 100.

The vibration motor 164 converts an electrical signal into mechanical vibration under the control of the controller 110. For example, when the mobile terminal 100 is in a vibration mode, the vibration motor 164 operates if a voice call is received from another device (not shown). The vibration motor 164 is provided as at least one unit in the housing of the mobile terminal 100 and may operate in response to a user's touch operation (e.g., touching and/or dragging) with respect to the touch screen 190.

The connector 165 is used as an interface for connecting the mobile terminal 100 to an external device (not shown) or a power source (not shown). Data stored in the storage unit 175 of the mobile terminal 100 is transmitted to an external device (not shown) through a wired cable connected to the connector 165 under the control of the controller 110, or data of an external device (not shown) may be received through the wired cable connected to the connector 165, and stored in the storage unit 175 under the control of the controller 110. Also, the mobile terminal 100 may receive power or charges a battery from a power source (not shown) through the wired cable connected to the connector 165.

The keypad 166 receives key input from a user in order to control the mobile terminal 100. The keypad 166 includes a physical keypad (not shown) that is provided on the mobile terminal 100, or a virtual keypad (not shown) that is displayed on the touch screen 190. Alternatively, the mobile terminal 100 may include no physical keypad according to a structure of the mobile terminal 100.

Earphones are insertable into the earphone jack 167.

The sensor module 170 includes at least one sensor for detecting a status of the mobile terminal 100. For example, the sensor module 170 may include a proximity sensor (not shown) for determining whether a user approaches the mobile terminal 100 or whether a finger or a pen 200 approaches the touch screen 190, an ambient light sensor (not shown) for measuring an amount of ambient light around the mobile terminal 100, a motion sensor (not shown) for detecting a motion (for example, rotation, acceleration, vibration) of the mobile terminal 100, a geo-magnetic sensor (not shown) for detecting a point of the compass of the mobile terminal 100 using the earth's magnetic field, a gravity sensor (not shown) for detecting a direction in which gravity is applied, and an altimeter (not shown) for measuring atmospheric pressure to detect an altitude. The sensor module 170 may further include other sensors than the above-mentioned sensors according to the performance of the mobile terminal 100.

The sensor module 170 may include a proximity sensor. The proximity sensor is a sensor for sensing a user's movement (for example, movement of a user's finger) in a predetermined distance from the touch screen 190. For example, if the touch screen 190 is a capacitive touch screen, and the sensor module 170 is a proximity sensor, the sensor module 170 embodied as a proximity sensor may detect a change in capacitance that has occurred in a predetermined range (for example, at a height of 10 cm) from the touch screen 190, thereby detecting a user's movement.

Alternatively, the sensor module 170 may be embodied as a fingerprint recognition sensor, and in this case, the sensor module 170 may be included in the fingerprint recognition unit 60.

The power supply unit 180 supplies power to at least one battery (not shown) installed in the housing of the mobile terminal 100, under the control of the controller 110. The batteries (not shown) supply power to the mobile terminal 100. Also, the power supply unit 180 supplies power received from an external power source (not shown) through the wired cable connected to the connector 165 to the mobile terminal 100.

The touch screen controller 195 converts an analog signal received from the touch screen 190 into a digital signal (for example, X and Y coordinates), and transmits the digital signal to the controller 110. The controller 110 controls the touch screen 190 using the digital signal received from the touch screen controller 195. For example, the controller 110 may select or execute a shortcut icon (not shown) displayed on the touch screen 190 in response to a touch. Alternatively, the touch screen controller 195 may be included in the controller 110.

According to an embodiment of the invention, the touch screen controller 195 may extract coordinates on the touch screen 190, corresponding to a proximity sensing input sensed by the sensor module 170. For example, it is assumed that a proximity sensing input for selecting a point (a first point) in a predetermined distance range from the touch screen 190 has been sensed by the sensor module 170, and the proximity sensing is capacitance-based sensing. In this case, the sensor module 170 may sense a change in capacitance that has occurred in the predetermined distance range from the touch screen 190, and the controller 110 may control the touch screen controller 195 to extract coordinates of a point (a second point) on the touch screen 190, corresponding to the point (the first point) at which capacitance has changed. For example, the second point may be a point on the touch screen 190, which is closest to the first point.

According to an embodiment of the invention, the mobile terminal 100 may connect to an external device (not shown) using an external device connector, such as the sub communication module 130, the connector 165, and the earphone jack 167.

The external device may include an earphone, an external speaker, a Universal Serial Bus (USB) memory, a battery charger, a Cradle/Dock, a Digital Multimedia Broadcasting (DMB) antenna, a mobile payment system, healthcare equipment (a blood glucose meter, etc.), a game, a vehicle navigation system, and the like, which can be removably connected to the mobile terminal 100 through a line. Also, the external device may include a short-range communication apparatus, such as a Bluetooth communication apparatus and a Near Field Communication (NFC) apparatus, which can connect to the mobile terminal 100 in a wireless fashion through short-range communication, a WiFi Direct communication apparatus, and a Wireless Access Point (WAP). Also, the external device may include another electronic device, a mobile phone, a smart phone, a tablet PC, a desktop computer, and a server.

Figure 4:
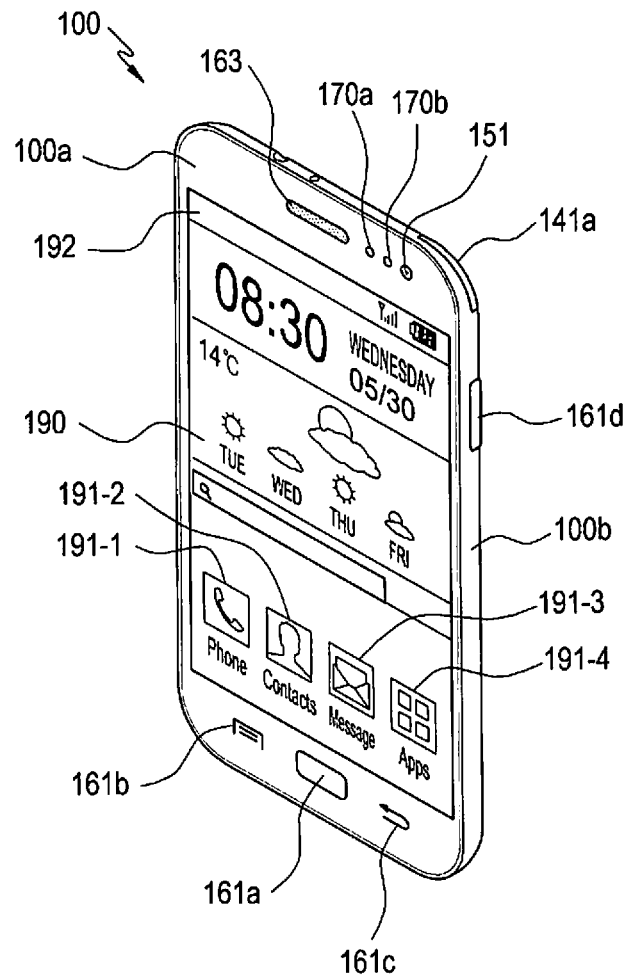
FIG. 4 is a diagram illustrating a perspective view of a front part of a mobile terminal according to an embodiment of the present invention.
Figure 5:
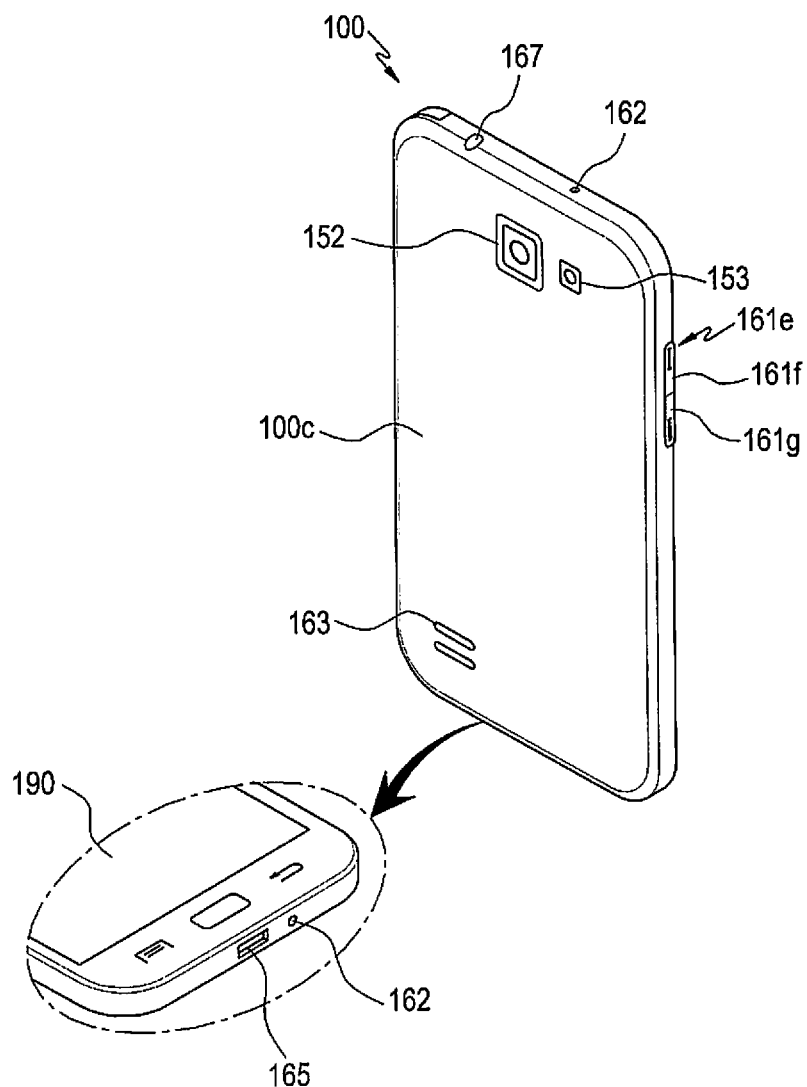
FIG. 5 is a diagram illustrating a perspective view of a rear part of a mobile terminal according to an embodiment of the present invention.

FIG. 4 is a diagram illustrating a perspective view of a front part of a mobile terminal according to an embodiment of the present invention, and FIG. 5 is a diagram illustrating a perspective view of a rear part of a mobile terminal according to an embodiment of the present invention.

Referring to FIG. 4, the touch screen 190 is disposed in the front, center part 100a of the mobile terminal 100. The touch screen 190 occupies the major area of the front part of the mobile terminal 100. FIG. 4 illustrates an example in which a main home screen is displayed on the touch screen 190. On the home screen, shortcut icons 191-1 191-2, and 191-3 for executing applications being often executed, a main menu key 191-4, a clock, and the weather are displayed. The main menu key 191-4 is used to display a menu screen on the touch screen 190. On the upper area of the touch screen 190, a status bar representing the status of the mobile terminal 100, such as battery level, intensity of reception signals, and current time, may be displayed.

Below the touch screen 190, a home button 161a, a menu button 161b, and a back button 161c are formed.

The home button 161a is used to display the main home screen on the touch screen 190. For example, if the home button 161a is pressed when a menu screen or a home screen different from the main home screen is displayed, the main home screen is displayed on the touch screen 190. Also, if the home button 161a is touched while applications are executed on the touch screen 190, the main home screen, as illustrated in FIG. 4, is displayed on the touch screen 190. The home button 161a is also used to display recently used applications on the touch screen 190 or to display a task manager.

The menu button 161b provides connectivity menus that can be used on the touch screen 190. The connectivity menus may include a widget adding menu, a lock screen changing menu, a search menu, an edit menu, and an environment setting menu.

The back button 161c is used to request display of a screen displayed just before a current screen or to quit a most recently used application.

The first camera 151, the ambient light sensor 170a, and the proximity sensor 170b may be disposed in the front part 100a of the mobile terminal 100. The second camera 152, a flash 153, and the speaker 163 may be disposed in the back part 103 of the mobile terminal 100.

A power/lock button 161da, volume buttons 161e including a volume-up button 161f and a volume-down button 161g, a terrestrial DMB antenna 141a for receiving broadcasting, and one or more microphones 162 are disposed in a side 100b of the mobile terminal 100. The terrestrial DMB antenna 141a is fixedly or removably attached to the mobile terminal 100.

The connector 165 is formed in the lower side of the mobile terminal 100. The connector 165 includes a plurality of electrodes, and may be connected to an external device in a wired manner. The earphone jack 167 is formed in an upper side of the mobile terminal 100. As described above, earphones are insertable into the earphone jack 167.

Figure 6:
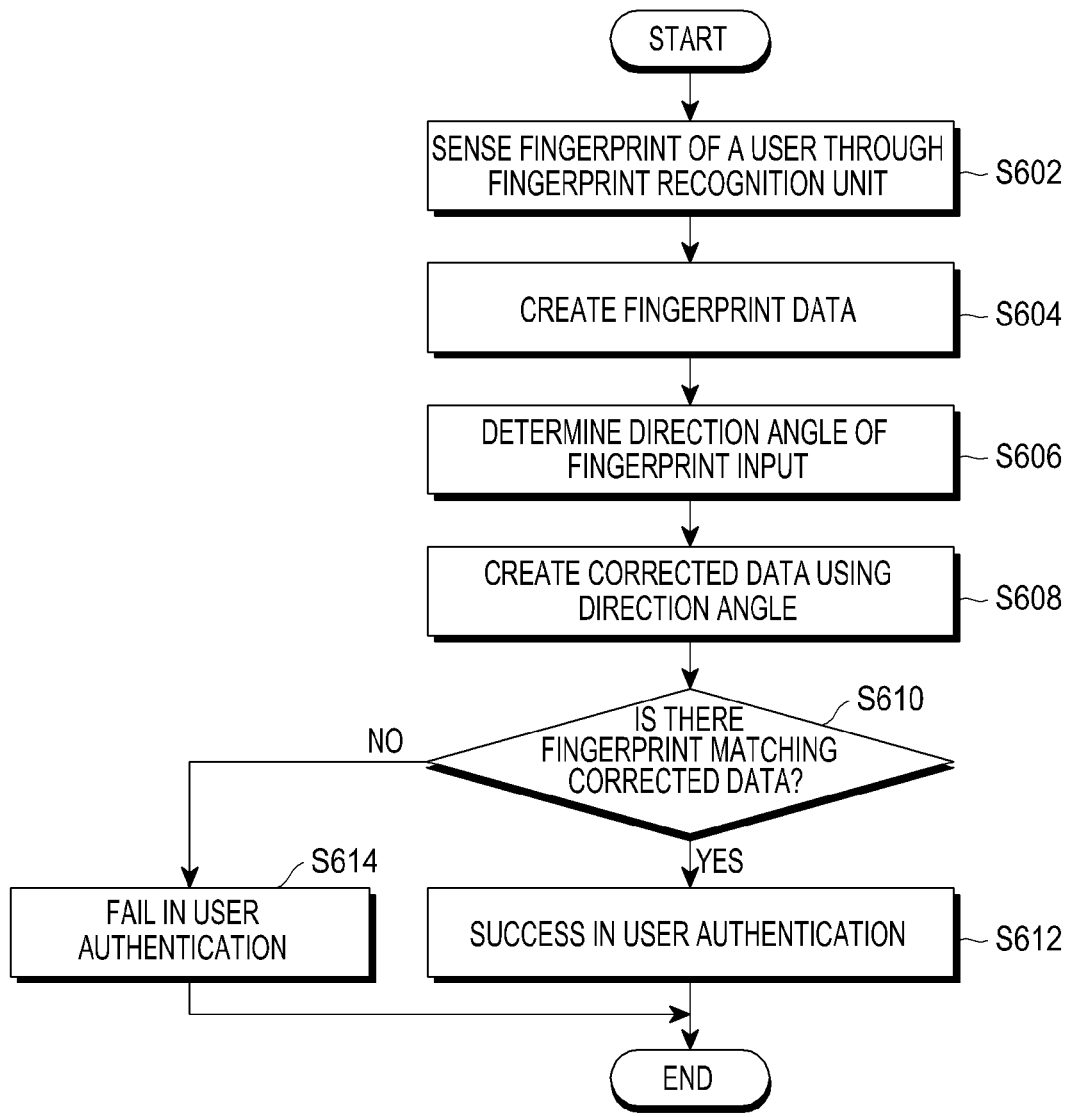
FIG. 6 is a flowchart illustrating a fingerprint recognition method, according to an embodiment of the present invention.

FIG. 6 is a flowchart illustrating a fingerprint recognition method, according to an embodiment of the present invention.

In the method illustrated in FIG. 6, it is assumed that the fingerprint recognition unit 60 is included in the touch screen 190. Accordingly, the touch screen 190 may receive a fingerprint input as input data from a user.

Referring to FIG. 6, a fingerprint recognition apparatus receives a fingerprint input through the fingerprint recognition unit 60. In step S602, the fingerprint recognition apparatus senses the fingerprint input as a fingerprint of a user through the fingerprint recognition unit 60. For example, in step S602, the fingerprint recognition unit 60 creates a fingerprint image corresponding to the fingerprint input.

In step S604, the fingerprint analyzer 10 creates fingerprint data corresponding to the fingerprint input.

In step S606, the direction angle determination unit 30 determines a direction angle of the fingerprint input, i.e., a direction angle of a fingerprint included in the fingerprint input, based on the fingerprint data. The direction angle of the fingerprint input is a degree by which the fingerprint input is inclined. For example, the direction angle determination unit 30 may calculate a direction angle of the fingerprint input based on the sizes or coordinates of a pressed area and a hovering area of the fingerprint input or may calculate an angle at which the fingerprint input is inclined with respect to a correct direction of a fingerprint input stored in the storage unit 175 and decide the calculated angle as a direction angle of the fingerprint input. For example, it is assumed that the fingerprint input is a fingerprint of a user's left hand thumb, and a correct direction of a left hand thumb finger is a direction perpendicular to the lower edge of the fingerprint recognition apparatus. In this case, if a fingerprint input inclined at 45° to the left with respect to the correct direction is received, the direction angle determination unit 30 may determine "45° in a left direction" as a direction angle of the fingerprint input.

In step S608, the fingerprint corrector 20 creates corrected data by reversely rotating the fingerprint included in the fingerprint input by the direction angle. That is, the fingerprint corrector 20 rotates the fingerprint input such that the fingerprint included in the fingerprint input is positioned in the correct direction. For example, if a fingerprint input inclined at 30° to the right with respect to the correct direction is received, the fingerprint corrector 20 creates corrected data for the fingerprint input by rotating the fingerprint input to the left by 30°.

The user authenticating unit 50 may determine whether a fingerprint matching the corrected data is found in the storage unit 175 in step S610. For this, the fingerprint searching unit 40 may search for a matching fingerprint stored in the storage unit 175. For example, the user authenticating unit 50 may authenticate the user based on the result of the search by the fingerprint searching unit 40. According to an embodiment of the present invention, the fingerprint searching unit 40 may extract one or more fingerprints in which similarities to the corrected data are equal to or greater than a reference value (for example, 90%), in the storage unit 175.

If a fingerprint matching the corrected data is found in the storage unit 175, the user authenticating unit 50 determine that the user's fingerprint is registered in the fingerprint recognition apparatus, i.e., authenticates the user as a registered user, in step S612. However, when there are no fingerprints stored in the storage unit 175 that match the corrected data, the user authenticating unit 50 determines that the user's fingerprint is not been registered in the fingerprint recognition apparatus, i.e., the user authentication fails, in step S614.

According to an embodiment of the invention, the user authenticating unit 50 may determine that a fingerprint in which similarity to the corrected data is greater than or equal to a reference value (for example, 90%) matches the corrected data.

As described above, if a fingerprint matching the corrected data has been found in the storage unit 175 ("Yes" in step S610), the user authenticating unit 50 may determine that the user has been successfully authenticated in step S612. If no fingerprint matching the corrected data has been found in the storage unit 175 ("No" in step S610), the user authenticating unit 50 may determine that authentication of the user has been failed in step S614.

Figure 7:
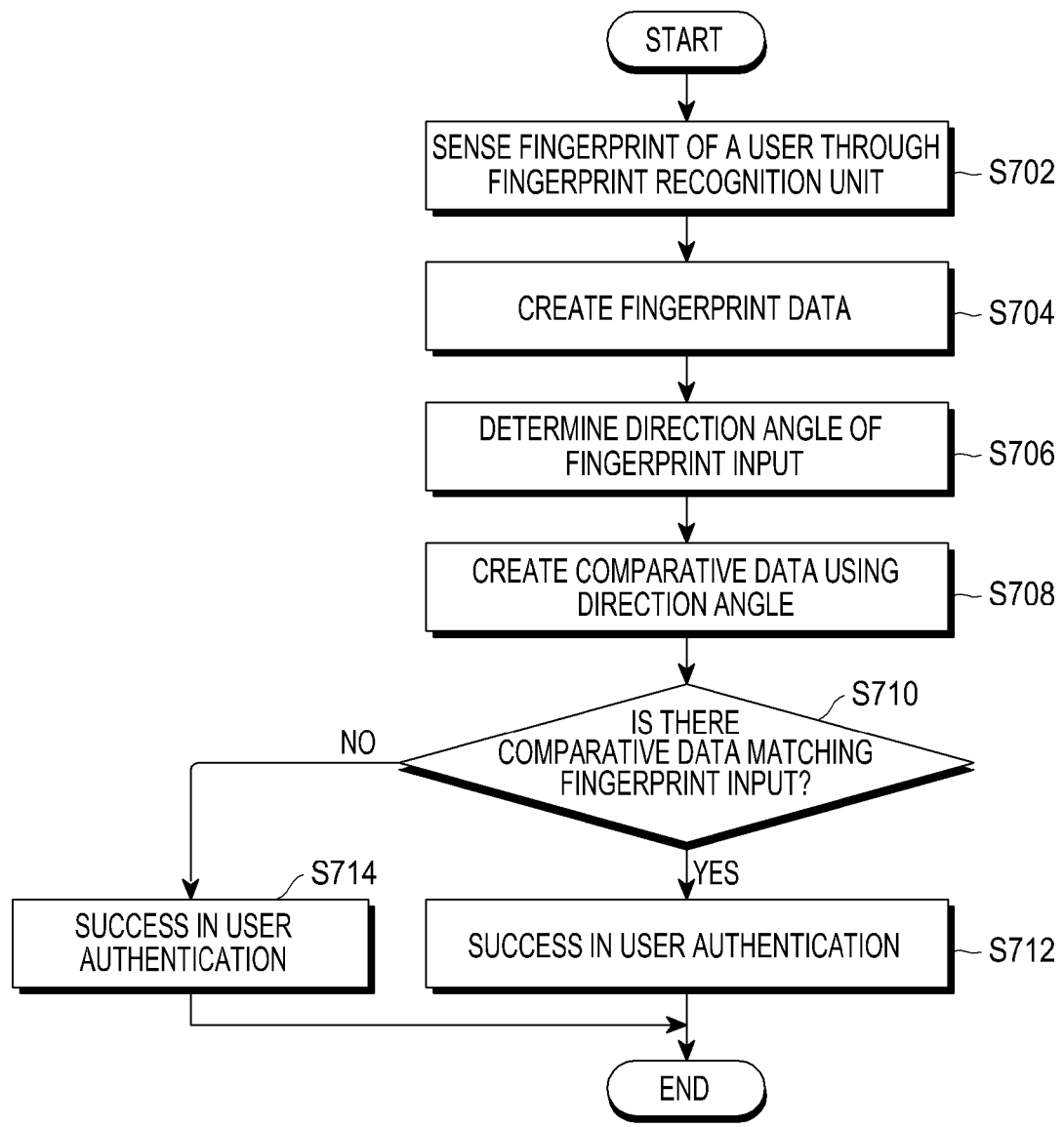
FIG. 7 is a flowchart illustrating a fingerprint recognition method, according to an embodiment of the present invention.

FIG. 7 is a flowchart illustrating a fingerprint recognition method, according to an embodiment of the present invention.

Referring to FIG. 7, a fingerprint recognition apparatus receives a fingerprint input through the fingerprint recognition unit 60 including at least one of the fingerprint scanner 62 and the touch screen 190. In step S702, the fingerprint recognition apparatus senses the fingerprint input as a fingerprint of a user through the fingerprint recognition unit 60. For example, the fingerprint recognition unit 60 may create a fingerprint image corresponding to the fingerprint input.

In step S704, the fingerprint analyzer 10 creates fingerprint data corresponding to the fingerprint input. As described above, the fingerprint input includes a pressed area and a hovering area.

The direction angle determination unit 30 determines a direction angle of the fingerprint input based on the fingerprint data in step S706. The direction angle of the fingerprint input is a degree by which a fingerprint of the pressed area of the fingerprint input is inclined. The direction angle determination unit 30 may calculate a direction angle of the fingerprint input based on the sizes or coordinates of the pressed area and the hovering area. The direction angle determination unit 30 may calculate an angle at which the fingerprint input is inclined with respect to a correct direction of a fingerprint input stored in the storage unit 175, and then decide the calculated angle as a direction angle of the fingerprint input. For example, if the fingerprint input is a fingerprint of a user's left hand thumb, and a correct direction of a left hand thumb is a direction perpendicular to the lower edge of the fingerprint recognition apparatus, if a fingerprint input inclined at 45° to the left with respect to the correct direction is received in step S702, the direction angle determination unit 30 may determine "45° in a left direction" as a direction angle of the fingerprint input.

In step S708, the fingerprint corrector 20 creates comparative data by rotating one or more fingerprints stored in the storage unit 175 by the direction angle.

In order to authenticate the user who has input the fingerprint in step S702, whether the fingerprint of the fingerprint input is a fingerprint registered in the fingerprint input apparatus is determined. If a fingerprint is input in an inclined state in step S702, the fingerprint corrector 20 creates comparative data by rotating one or more fingerprints stored in the storage unit 175 so that the fingerprints have the same direction angle as the fingerprint input. Because the fingerprint input has the same direction angle as the comparative data, the fingerprint searching unit 40 may easily extract comparative data matching the fingerprint input.

In step S710, the fingerprint searching unit 40 compares the fingerprint input to the comparative data created by the fingerprint corrector 20, and outputs the result of the comparison to the user authenticating unit 50, which determines whether comparative data matching the fingerprint input is found in the storage unit 175. If comparative data matching the fingerprint input is found in the storage unit 175, the user authenticating unit 50 determines that the user's fingerprint is stored in the storage unit 175, i.e., that the user successfully authenticated, in step S712.

However, if no comparative data matching the fingerprint input is found in the storage unit 175, the user authenticating unit 50 determines that the user's fingerprint is stored in the storage unit 175, i.e., that the user is not successfully authenticated, in step S714.

Figure 8:
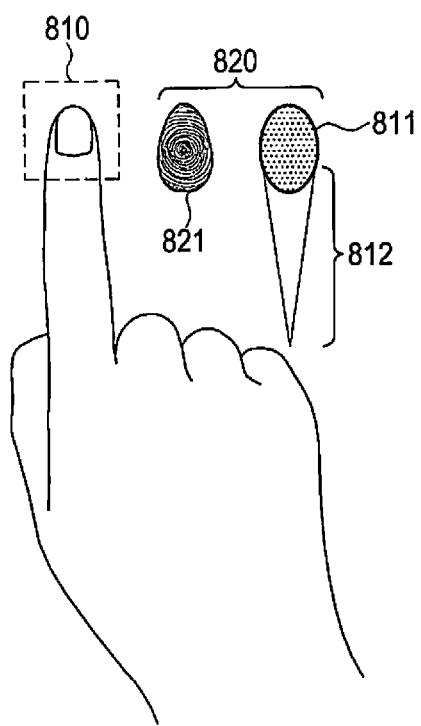
FIG. 8 illustrates a fingerprint input being recognized by a fingerprint recognition apparatus according to an embodiment of the present invention.

FIG. 8 illustrates a fingerprint input being recognized by a fingerprint recognition apparatus according to an embodiment of the present invention.

Referring to FIG. 1, a user contacts the fingerprint recognition unit 60 of the fingerprint recognition apparatus the user's right hand index fingertip 810 including a fingerprint 821, thereby making a fingerprint input. The fingerprint recognition unit 60 creates fingerprint data 820 corresponding to the fingerprint input. The fingerprint data 820 includes the fingerprint 821, information about a pressed area 811 of the fingerprint recognition unit 60 contacted by the right hand index fingertip 810, and information about a hovering area 812 of the fingerprint recognition unit 60 above which the user's right hand index fingertip 810 is positioned without contacting the fingerprint recognition unit 60. The controller 110 detects a direction which the pressed area 811 or the hovering area 812 indicates on the fingerprint recognition unit 60, and determines a direction angle of the fingerprint 821 based on the detected direction.

Figure 9:
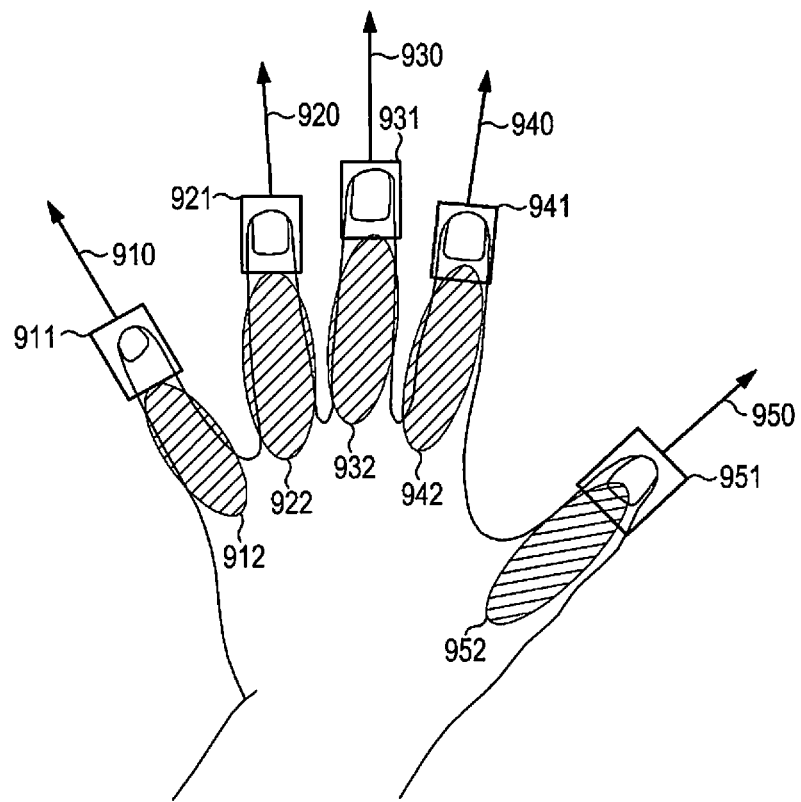
FIG. 9 illustrates a fingerprint input being recognized by a fingerprint recognition apparatus according to an embodiment of the present invention.

FIG. 9 illustrates a fingerprint input being recognized by a fingerprint recognition apparatus according to an embodiment of the present invention.

Referring to FIG. 9, the fingerprint recognition apparatus receives fingerprint inputs from all of a user's fingers on the user's left hand. In the current example, the fingerprint recognition apparatus may receive fingerprint inputs from each of the individual fingers to create fingerprint data for each finger. The fingerprint inputs corresponding to the individual fingers include pressed areas 911, 921, 931, 941, and 951 and hovering areas 912, 922, 932, 942, and 952.

Additionally, FIG. 9 illustrates correct directions 910, 920, 930, 940, and 950 of the fingerprints corresponding to the individual fingers. For example, as illustrated in FIG. 9, the correct directions 910, 920, 930, 940, and 950 of the fingerprints are directions indicated by the user's five fingers when the user spreads out the five fingers.

Figure 10A:
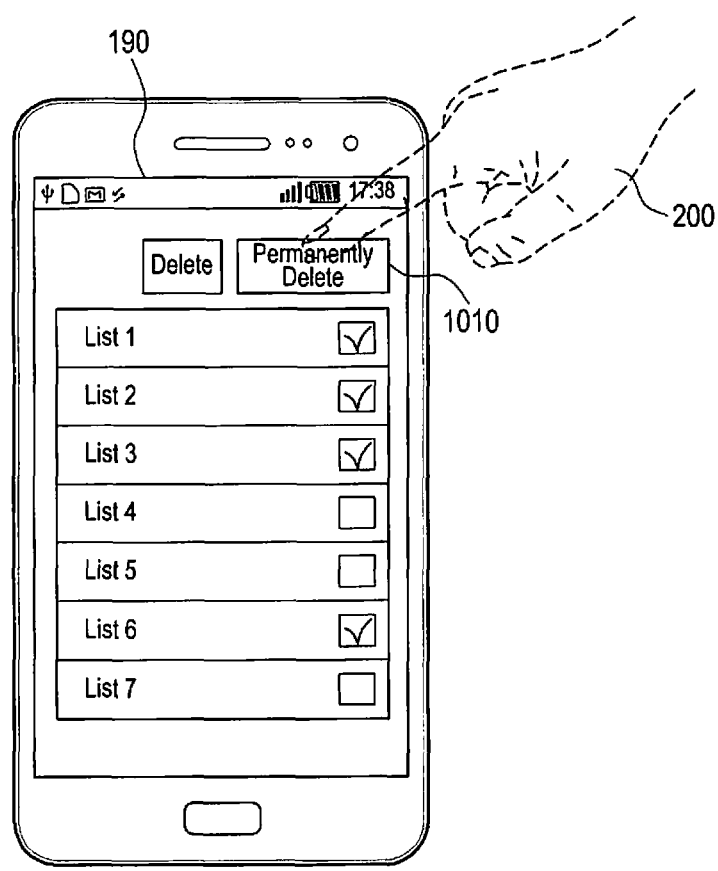
FIGS. 10A, 10B, and 10C illustrate examples of a mobile terminal including a fingerprint recognition apparatus using a fingerprint recognition function according to an embodiment of the present invention.
Figure 10B:
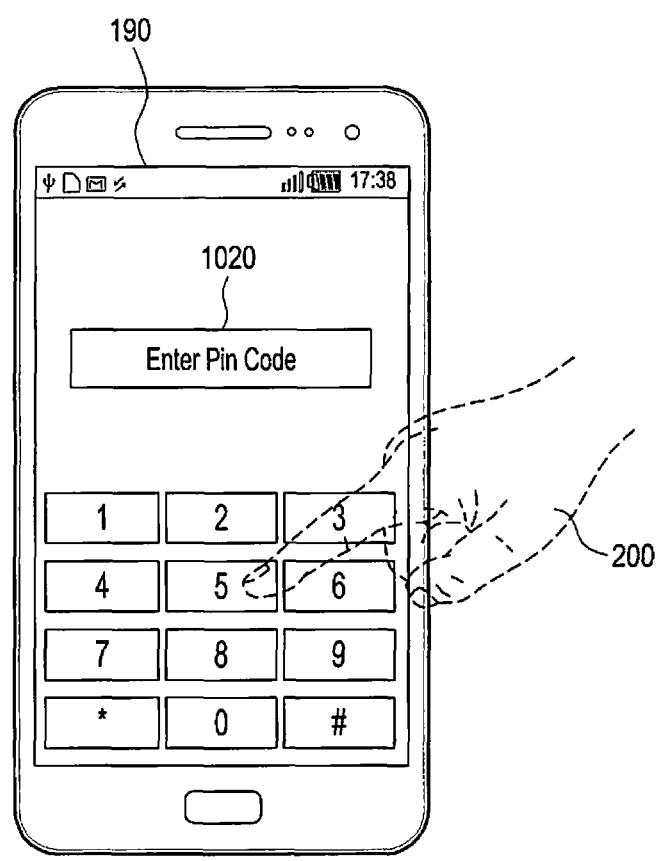
Figure 10C:
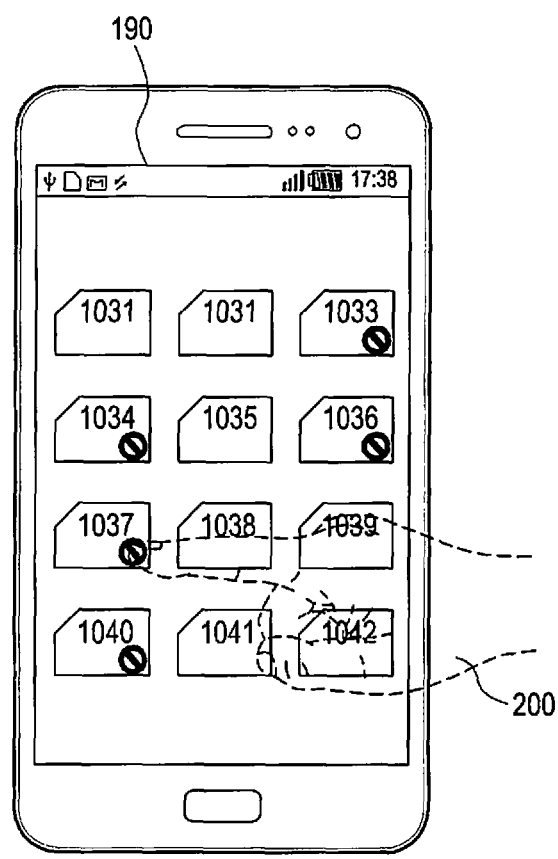

FIGS. 10A, 10B, and 10C illustrate examples of a mobile terminal including a fingerprint recognition apparatus using a fingerprint recognition function according to an embodiment of the present invention.

Specifically, FIG. 10A illustrates an example of deleting or permanently deleting items List 1, List 2, List 3, List 4, List 5, List 6, and List 7 displayed on the touch screen 190. In FIG. 10A, because the user 200 wants to delete several of the displayed items List 1, List 2, List 3, List 4, List 5, List 6, and List 7, the user 200 only needs to select the corresponding items and press a "Delete" button. However, when the user 200 wants to permanently delete several of the displayed items List 1, List 2, List 3, List 4, List 5, List 6, and List 7, additional authentication is required. Accordingly, if the user 200 wants to permanently delete the items List 1, List 2, List 3, and List 6, the user 200 checks the items List 1, List 2, List 3, and List 6, and then makes a fingerprint input on a "Permanently Delete" button 1010 displayed on the touch screen 190. According to an embodiment of the invention, when the user 200 makes a fingerprint input on the "Permanently Delete" button 1010, the fingerprint recognition apparatus confirms that the user is authorized to permanently delete items List 1, List 2, List 3, and List 6, as described above, and permanently deletes the items when the user is successfully authenticated, e.g., step S712 in FIG. 7.

FIG. 10B illustrates an example of displaying a numeric keypad on the touch screen 190 to receive a pin code 1020 from a user 200. In FIG. 10B, the mobile terminal 100 receives a pin code from the user 200 while authenticating the user 200. The touch screen 190 displays a numeric keypad for receiving the pin code in the pin code field 1020, and the user 200 selects numerical keys from among a plurality of numeric keys arranged in the numeric keypad to input the pin code via the touch screen 190. While entering the pin code, the mobile terminal 100 authenticates the user 200 using the fingerprint input, as described above, and will only recognize the pin code input by the user 200 when the user has also been successfully authenticated through the fingerprint input.

FIG. 10C illustrates an example of deleting folders 1033, 1034, 1036, 1037, and 1040 from among a plurality of folders 1031, 1032, 1033, 1034, 1035, 1036, 1037, 1038, 1039, 1040, 1041, and 1042 displayed on the touch screen 190. In order to delete the folders 1033, 1034, 1036, 1037, and 1040, a user 200 must be authenticated. That is, the user 200 selects the folders 1033, 1034, 1036, 1037, and 1040, and simultaneously makes a fingerprint input with the user's fingertip, thereby requesting the mobile terminal 100 to delete the folders 1033, 1034, 1036, 1037, and 1040. More specifically, the user 200 presses at least one part of each of the folders 1033, 1034, 1036, 1037, and 1040 to input a fingerprint to the touch screen 190 and select the corresponding folder for deletion. Thereafter, if the user is authenticated through the fingerprint input, the mobile terminal 100 will delete folders for which fingerprint inputs have been made.

According to the fingerprint recognition method and apparatus as described above, by determining a direction of a fingerprint input by a user, it is possible to quickly and correctly authenticate the user.

The fingerprint recognition method according to embodiments of the present invention may be implemented in the form of hardware, software, or a combination of hardware and software. The software may be stored in a volatile or non-volatile memory device such as, for example, a Read-Only Memory (ROM), regardless of whether it is erasable or re-writable, in a memory such as, for example, a Random Access Memory (RAM), a memory chip, and an Integrated Circuit (IC), or in an optically/magnetically recordable and machine (e.g., a computer)-readable storage medium such as, for example, a Compact Disk (CD), a Digital Versatile Disk (DVD), a magnetic disk, and a magnetic tape.

The fingerprint recognition method according to the embodiments of the present invention may be implemented as a computer or mobile terminal including a controller and a memory, and the memory is an example of a machine-readable storage medium suitable to store one or more programs, including instructions implementing embodiments of the present invention. Therefore, embodiments of the present invention include programs including codes for implementing the devices and methods as set forth in the appended claims of the specification, and a machine (e.g., a computer)-readable storage medium storing these programs. These programs may be electronically transferred through any media and equivalents thereof, such as communication signals, which are transferred through wired or wireless connections.

Also, the fingerprint recognition apparatus or the mobile terminal may receive and store the programs from a program providing apparatus connected in a wired/wireless fashion. The program providing apparatus may include a memory for storing a program including instructions instructing the fingerprint recognition apparatus or the mobile terminal to perform a predetermined content protection method, and information, etc. needed for the content protection method, a communication unit for performing wired/wireless communication with the fingerprint recognition apparatus or the mobile terminal, and a controller for transmitting the program to the mobile terminal according to a request from the fingerprint recognition apparatus or the mobile terminal or automatically.

While the present invention has been shown and described with reference to certain embodiments thereof, it will be understood by those skilled in the art that various changes in form and details may be made therein without departing from the spirit and scope of the present invention as defined by the appended claims and their equivalents.

What is claimed is:

1. A method for authenticating a user using a fingerprint by a fingerprint recognition apparatus, the method comprising:
   generating, by a fingerprint sensor of the fingerprint recognition apparatus, an image corresponding to a user input, using a finger of a user inputted to the fingerprint sensor;
   if a size of the image is larger than a predetermined size, determining, by a controller of the fingerprint recognition apparatus, the user input as a fingerprint inputted to the fingerprint recognition apparatus;
   measuring, by the controller of the fingerprint recognition apparatus, a direction angle of the image, wherein the direction angle is equal to an inputted angle of the fingerprint inputted to the fingerprint recognition apparatus;
   creating, by the controller, at least one comparative data by rotating at least one fingerprint image by the direction angle of the image, wherein the at least one fingerprint image is pre-stored in the fingerprint recognition apparatus;
   comparing, by the processor, the image with the at least one comparative data; and
   if the image and the at least one comparative data match, determining, by the controller, that the user of the fingerprint recognition apparatus is successfully authenticated.

2. The method of claim 1, further comprising:
   if the image and the at least one comparative data do not match, determining, by the controller, that the user is not successfully authenticated.

3. The method of claim 1, further comprising:
   if the size of the image is not larger than the predetermined size, determining, by the controller, the user input as an invalid input.

4. A fingerprint recognition apparatus for authenticating a user using a fingerprint comprising:
   a fingerprint sensor configured to generate an image corresponding to a user input; and
   a controller configured to:

if a size of the image is larger than a predetermined size, determine the user input as a fingerprint inputted to the fingerprint recognition apparatus, measure a direction angle of the image, wherein the direction angle of the image is equal to an inputted angle of the fingerprint inputted to the fingerprint recognition apparatus, create at least one comparative data by rotating at least one fingerprint image by the direction angle of the image, wherein the at least one fingerprint image is pre-stored in the fingerprint recognition apparatus, compare the image with the at least one comparative data, and if the image and the at least one comparative data match, determine that the user of the fingerprint recognition apparatus is successfully authenticated.

5. The fingerprint recognition apparatus of claim 4, further comprising a memory configured to store the at least one fingerprint image.

6. The fingerprint recognition apparatus of claim 4, wherein the controller is further configured to determine that the user is not successfully authenticated, if the image and the at least one comparative data do not match.

7. The fingerprint recognition apparatus of claim 4, wherein the controller is further configured to determine the user input as an invalid input, if the size of the image is not larger than the predetermined size.

* * * * *